Oct. 15, 1957     E. B. CLARK     2,809,763
SWITCH BOX WITH TEMPORARY MOUNTING TANGS
Filed Dec. 1, 1953
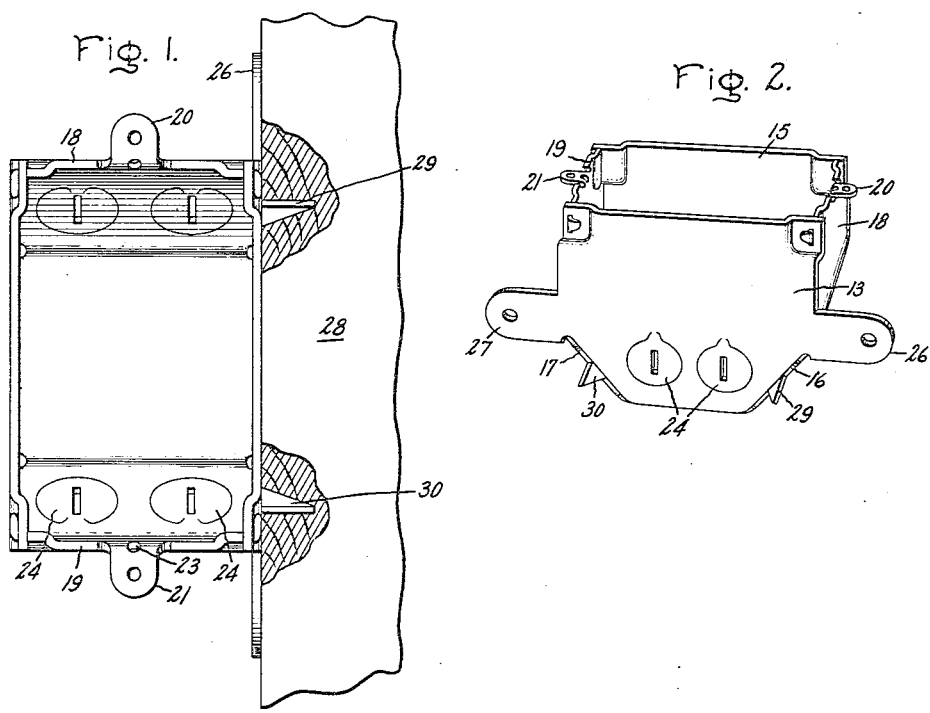
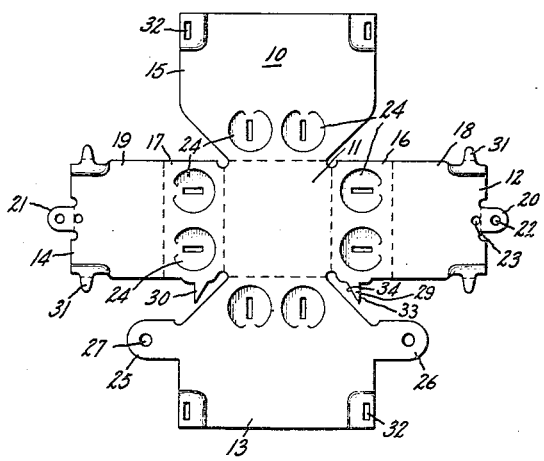
Inventor:
Edward B. Clark,
by
His Attorney.

United States Patent Office 2,809,763
Patented Oct. 15, 1957

2,809,763

SWITCH BOX WITH TEMPORARY MOUNTING TANGS

Edward B. Clark, Milford, Conn., assignor to General Electric Company, a corporation of New York Application December 1, 1953, Serial No. 395,343

3 Claims. (Cl. 220—3.9)

The present invention relates to an electric switch box for house wiring systems such as are used to house a wall switch, a convenience outlet, or similar devices.

The object of my invention is to provide an improved construction of an electric switch box which is simple, yet strongly built, and which may be manufactured at a reduction in cost over present designs.

The principal object of my invention is to provide temporary mounting tangs on a side wall of a switch box which are capable of supporting the box on a stud of a wall structure and which are unique in the manner in which they resist any pulling or twisting force, or a force due to vibrations, which may be applied to the box that might dislodge or loosen the box from the stud.

It is not broadly new to provide temporary mounting tangs on a side wall or the mounting bracket of an electric switch box. This is old and well-known in the art, but difficulty has been experienced with previous designs in firmly mounting the box to the stud before the nails are driven into place. Most of the present day mounting tangs for switch boxes are in the shape of isosceles triangles. Other designs of switch boxes are provided with mounting tangs in the shape of a right triangle similar to the tangs of the present invention, but they are not arranged in the particular manner of this invention; therefore, they do not obtain the new and unobvious results which I intend to point out hereinafter.

According to my invention, an electric switch box is provided with temporary mounting tangs which project outwardly from a side wall of the box and are normal thereto. The tangs are in the shape of a right triangle and lie within non-parallel planes so that when the box is fastened to a stud by driving the tangs into the stud until the box is flush against the stud, the perpendicular side edges of the tangs cooperate to resist any force which may be applied to the box that might dislodge the box from the stud.

My invention will be better understood from the following description taken in connection with the accompanying drawing, and its scope will be pointed out in the appended claims.

In the drawing:

Fig. 1 is an elevational view showing the switch box embodying my invention temporarily supported on a stud by the mounting tangs.

Fig. 2 is a perspective view of the box of Fig. 1 showing the side wall of the box which contains the mounting tangs.

Fig. 3 is a view showing the layout of the switch box in its unfolded, unassembled position.

Referring in detail to the drawing, my invention is seen as applied to a beveled corner switch box, but it should be understood that my invention is not limited in its application to such a box. It is true, however, that the present invention is especially useful in a one-piece folded beveled corner box. For this reason, a complete description of the entire box will be given below.

The switch box embodying the invention is made from a sheet metal stamping or blank 10. The blank 10 is provided with a bottom wall 11 and side walls 12, 13, 14, and 15. Since the walls 12 and 14 are provided with a beveled corner, they consist of the beveled portions 16 and 17 and the main vertical wall portions 18 and 19 respectively.

Mounting ears 20 and 21 are provided on the outer edges of the walls 12 and 14, respectively. Each mounting ear is complete with a threaded aperture 22. Adjacent the threaded aperture 22 is a second aperture 23, the purpose of which is to facilitate the easy bending of the mounting ear so that in the final assembled position, the mounting ears are in a plane which lies perpendicular to the side walls of the box. A switch or a convenience outlet is mounted in a switch box by the usual method of inserting screws (not shown) through apertures formed in the mounting strap of the switch or outlet and into the threaded apertures 22.

Cables must be brought into the box and, as a result, knockouts or pryouts must be provided in the walls of the box. As shown on the drawing, each side wall is provided with a pair of pryouts 24. A pryout is a section of metal sufficiently loosened during the manufacturing process that it can be easily removed by an electrician to form a cable-receiving opening. They are described as pryouts because they are usually provided with a narrow slot to receive the blade of a screw driver which is maneuvered to twist the pryout loose from the box. The pryouts 24 are punched in the blank 10 and then knocked back flush with the walls of the box as is seen in Fig. 2 so that the outer surfaces of the box have flat sides.

There are many ways of mounting a switch box in a wall structure, but the simplest way is to nail it to one of the studs, if there happens to be one in the right location. Formed as part of the side wall 13 are a pair of oppositely extending projections 25 and 26, each of which are provided with a nail-receiving aperture 27. These projections 26 and 27 constitute a mounting bracket which may be placed against the stud member 28 shown in Fig. 1 so that nails (not shown) may be driven through the apertures 27 to permanently fasten the box to the stud. It often turns out to be awkward for an electrician to nail a switch box not having temporary mounting tangs to a stud when he has to support the box and position a nail with one hand while handling a hammer in the other hand. For this reason, temporary mounting tanks 29 and 30 are provided as an extension of the beveled corner portions 16 and 17 of the side walls 12 and 14, as can be seen in Fig. 3. The tangs are in the shape of a right triangle. Looking at tang 29, there is a perpendicular side edge 33 and an inclined edge or hypotenuse 34. When the box is folded into its completed form, the tangs 29 and 30 are disposed in the planes of the beveled corner wall portions 16 and 17 and are perpendicular to the side wall 13 of the box. One side edge of each tang 29 and 30 is also perpendicular to the side wall 13 of the box.

When the box is folded into shape, the locking tongues 31, at each of the outer corners of the walls 12 and 14, extend through the apertures 32, which are located on the outer corners of the side walls 13 and 15. There is a copending application, now abandoned, Serial No. 395,361, which was filed on December 1, 1953, and assigned to the same assignee as the present application, drawn to cover the invention of the fastening means for connecting the side walls together. The invention claimed in this application is primarily directed to a box having temporary mounting tangs 29 and 30 with their novel shape and relative location clearly indicated.

The box is mounted on the stud by holding the box at the desired location against the stud 28 with the points of the tangs 29 and 30 in engagement with the stud. Hammer blows against the opposite side wall 15 of the box will drive the tangs into the stud until the wall 13 is flush against the surface of the stud as is seen in Fig. 1. The preferred method to use is to try to drive the tangs into the stud without tilting the box while so doing so that the tangs do not make larger holes in the stud than the shape of the tangs. If this method is practiced, it is very difficult by the use of one's hands to twist the box off the stud. This is so because of the interaction of the side edges of the tangs 29 and 30 which are perpendicular to the side wall 13 of the box. If the tangs 29 and 30 were in the shape of isosceles triangles, a slight backing off of the tangs out of their receiving holes in the stud would seriously loosen the box. Then, only the friction between the side faces of the tangs and the side faces of the receiving holes would support the box on the stud.

Since the mounting tangs 29 and 30 are in the shape of right triangles and are disposed in non-parallel planes, the side edges of the tangs which are perpendicular with the side wall 13 of the box are always in frictional engagement with the complemental walls in the tang-receiving holes of the stud when a straight pulling force is applied to the box. This frictional engagement is in addition to the frictional engagement of the side faces of the tangs; therefore, the present box will resist greater forces tending to dislodge the box than one equipped with tangs in the shape of isosceles triangles.

The non-parallel relationship of the tangs 29 and 30 will permit them to twist or move only in their own individual planes. Therefore, the twisting movement of one tang is resisted by the other tang.

In addition, a right triangular tang is easier to drive into the stud and is held tighter by the stud because this shape more nearly approximates the shape of a nail. A tang in the shape of an isosceles triangle would be more difficult to drive into the stud because it is relatively twice the size of a right triangular tang, and because it tends to stamp or compress a tang-receiving hole in the stud rather than wedge itself into the wood as in the present invention.

It will be appreciated by one skilled in this art that the improved temporary mounting tangs of this invention are particularly advantageous when these boxes are being installed by a large force of electricians working closely behind the carpenters who are installing the studding. It often happens that with boxes of different design the vibrations set up by the hammering of the other workmen would loosen the box before the electrician could permanently nail the box to the stud thereby slowing down the work of installing the electric wiring circuits.

It will also be clear to one skilled in this art that it is because of the non-parallel arrangement of the temporary mounting tangs 29 and 30 and also because of the particular right triangular shape of the tangs that I have provided an unusually strong temporary connection for supporting a switch box on a stud.

Modifications of this invention will occur to those skilled in the art, and it is to be understood, therefore, that this invention is not limited to the particular embodiment disclosed, but that it is intended to cover all modifications which are within the true spirit and scope of this invention.

What I claim as new and desire to secure by Letters Patent of the United States is:

1. In combination with an electric switch box having flat outer side walls, temporary mounting tangs projecting outwardly from one side wall thereof and normal thereto, a projection extending outwardly from each side edge of said side wall with a nail-receiving aperture formed in each projection, said projections constituting a mounting bracket for the box, the said tangs lying between the said projections and within non-parallel planes, the shape of said tangs being that of a right triangle with one edge of each tang being perpendicular to the said side wall so that the box is temporarily held to a stud member by driving the tangs into the stud.

2. In a switch box as recited in claim 1 wherein the box is a beveled corner box and the temporary mounting tangs are formed as an integral extension of the beveled wall portions of the box.

3. In combination with the beveled corner switch box having flat side walls, one of said side walls having an integral mounting bracket which lies within the plane of said side wall, and temporary mounting tangs formed as an integral extension of the beveled wall portions of the box in the plane of said portions and projecting outwardly from the said side wall containing the mounting bracket and normal thereto, the said tangs lying within non-parallel planes and being in the shape of a right triangle, one side edge of each tang being perpendicular to the said side wall.

References Cited in the file of this patent

UNITED STATES PATENTS

| | | |
|---|---|---|
| Re. 17,222 | Newman et al. | Feb. 26, 1929 |
| D. 52,805 | Nickerson | Dec. 24, 1918 |
| 187,636 | Jameison | Feb. 20, 1877 |
| 1,454,722 | Boutin | May 8, 1923 |
| 1,734,322 | Appleton | Nov. 5, 1929 |
| 1,808,011 | Barnett | June 2, 1931 |
| 2,536,320 | Smith | Jan. 2, 1951 |